(12) United States Patent
Wadham et al.

(10) Patent No.: US 8,899,262 B2
(45) Date of Patent: Dec. 2, 2014

(54) TAMPER-RESISTANT VALVE AND CONNECTION ARRANGEMENT

(75) Inventors: Paul Wadham, Haslemere (GB); Andrew Tatarek, Aldershot (GB)

(73) Assignee: Linde Aktiengesellschaft, Munich (DE)

( * ) Notice: Subject to any disclaimer, the term of this patent is extended or adjusted under 35 U.S.C. 154(b) by 868 days.

(21) Appl. No.: 12/936,920

(22) PCT Filed: Apr. 8, 2009

(86) PCT No.: PCT/GB2009/000915
§ 371 (c)(1),
(2), (4) Date: Jan. 4, 2011

(87) PCT Pub. No.: WO2009/125180
PCT Pub. Date: Oct. 15, 2009

(65) Prior Publication Data
US 2011/0146813 A1 Jun. 23, 2011

(30) Foreign Application Priority Data

Apr. 10, 2008 (GB) .................................. 0806530.2

(51) Int. Cl.
*F16K 31/12* (2006.01)
*F16K 35/00* (2006.01)
*F16K 1/30* (2006.01)
*F16K 35/02* (2006.01)

(52) U.S. Cl.
CPC . *F16K 35/00* (2013.01); *F16K 1/30* (2013.01); *F16K 1/307* (2013.01); *F16K 35/022* (2013.01)
USPC ...................... 137/492.5; 137/505.44; 251/63

(58) Field of Classification Search
CPC ...................... F16K 1/30–1/308; F17C 13/045

USPC ................. 137/377, 492, 492.5, 878, 505.44, 137/115.07, 488, 613, 540; 251/62, 63, 251/63.5, 149.9, 144
See application file for complete search history.

(56) References Cited

U.S. PATENT DOCUMENTS 2,621,885 A * 12/1952 Schmitt ............................ 251/63
2,970,609 A * 2/1961 Beremand ........................ 251/63

(Continued)

FOREIGN PATENT DOCUMENTS

DE 295 15 505 U1 1/1996
EP 0 666 087 A1 3/1994

(Continued)

OTHER PUBLICATIONS

Machine translation for FR2619432A1 taken from EPO website.*

(Continued)

*Primary Examiner* — Craig Schneider
*Assistant Examiner* — Craig J Price
(74) *Attorney, Agent, or Firm* — David A. Hey

(57) ABSTRACT

A gas cylinder valve 2 is able to be opened by application of a pilot gas pressure. In certain embodiments the gas cylinder valve 2 is usable with a yoke 8 for engaging with a valve assembly of a gas cylinder 1, the yoke comprising a pilot gas passage 28 able to connect a pilot gas chamber 37 in the cylinder valve assembly to a source of pressurized pilot gas and the cylinder gas port of the gas cylinder valve to an external cylinder gas passage. The valve and yoke enable the tamper-resistance of a gas cylinder to be improved.

7 Claims, 16 Drawing Sheets

(56) References Cited

U.S. PATENT DOCUMENTS

| | | | |
|---|---|---|---|
| 3,334,648 A * | 8/1967 | Probst | 251/62 |
| 3,518,032 A * | 6/1970 | Degroff et al. | 251/62 |
| 3,698,425 A * | 10/1972 | Fisher | 137/505.25 |
| 3,881,505 A | 5/1975 | Dunkelis | |
| 4,015,630 A * | 4/1977 | Contreras | 137/505.25 |
| 4,015,865 A * | 4/1977 | Kongelka | 137/316 |
| 4,046,157 A * | 9/1977 | Cazalaa et al. | 137/76 |
| 4,159,102 A * | 6/1979 | Fallon et al. | 251/149.6 |
| 4,266,538 A * | 5/1981 | Ruchti | 251/58 |
| 4,572,477 A * | 2/1986 | Phlipot et al. | 137/613 |
| 4,655,246 A * | 4/1987 | Phlipot et al. | 137/613 |
| 4,669,493 A | 6/1987 | Kober et al. | |
| 5,071,148 A * | 12/1991 | Salvucci, Sr. | 137/382 |
| 5,640,997 A * | 6/1997 | Reed et al. | 137/877 |
| 5,704,589 A * | 1/1998 | Canuteson | 137/613 |
| 6,000,419 A * | 12/1999 | Bernhard | 137/322 |
| 6,026,854 A * | 2/2000 | Davidson | 137/613 |
| 6,082,396 A * | 7/2000 | Davidson | 137/505.25 |
| 6,089,259 A * | 7/2000 | Shuman, Jr. | 137/505.25 |
| 6,158,457 A * | 12/2000 | Byrd et al. | 137/505.25 |
| 6,161,570 A | 12/2000 | McNeely | |
| 6,386,227 B1 | 5/2002 | Powell | |
| 7,658,366 B2 * | 2/2010 | Larsen | 251/63.5 |
| 8,240,325 B2 * | 8/2012 | Zaiser et al. | 137/613 |
| 8,353,314 B2 * | 1/2013 | Radford et al. | 137/614.05 |
| 2007/0186977 A1 | 8/2007 | Wong | |
| 2008/0072977 A1 | 3/2008 | George et al. | |
| 2008/0149103 A1 * | 6/2008 | Taylor | 137/614.2 |

FOREIGN PATENT DOCUMENTS

| | | |
|---|---|---|
| EP | 1 148 279 A2 | 10/2001 |
| FR | 2619432 A1 * | 2/1989 |
| GB | 1 078 398 | 8/1967 |

OTHER PUBLICATIONS

Machine translatiion for FR2619432 A1 taken from EPO website on Jul. 23, 2014, 2 pages.*

* cited by examiner

TAMPER-RESISTANT VALVE AND CONNECTION ARRANGEMENT

CROSS REFERENCE TO RELATED APPLICATIONS

This application claims priority from International Application Number PCT/GB2009/000915 filed Apr. 8, 2009 which claims priority from British Application Number 0806530.2 filed Apr. 10, 2008.

BACKGROUND OF THE INVENTION

The invention relates to tamper-resistant valves for use on gas cylinders and to connection devices for use therewith.

Gas cylinders are vessels, typically but not necessarily of cylindrical shape, which are used for the storage of gas under a pressure, of at least 40 bar, and sometimes up to 300 bar, and typically in the range of 80 to 200 bar. The gas cylinder has a mouth which engages a valve closing the cylinder. The engagement usually of complementary screw-threads is required to prevent the elevated pressure within the cylinder from ejecting the valve. The valve has an internal configuration which enables the cylinder to be filled with gas and which enables gas to be supplied from the cylinder to a user. The valve is opened and closed manually.

Nitrous oxide is used in admixture with oxygen, typically as a 50/50 mixture, for short anaesthetic applications. It is extremely good, giving almost immediate pain relief, and flushes out of the body very quickly. In some countries the use of a pre-mixed gas is allowed, but in others, notably the USA, the use of pre-mixed gas is not permitted. In those circumstances, oxygen and nitrous oxide can be supplied separately and mixed on demand in a mixing device.

It is common for the nitrous oxide to be supplied in a pin index cylinder. In practice, however, it has been found that nitrous oxide supplied in this form is sometimes abused by staff, who could crack the valve open, and breathe the gas for "recreational" purposes. Also the gas can be stolen, and abused by people outside. The level of this abuse has been serious enough that the use of nitrous oxide has been discontinued in many establishments.

BRIEF SUMMARY OF THE INVENTION

The invention provides a gas cylinder valve able to be opened by application of a pilot gas pressure.

The valve of the invention enables the initiation of a flow of gas from the gas cylinder to be made essentially dependent upon the detection of a pilot gas pressure. The pilot gas pressure can be generated from another source of gas, especially a gas with which the gas from the cylinder is to be mixed. That allows tamper-resistance of a gas cylinder, for example a cylinder of nitrous oxide, to be improved.

In one embodiment of the invention, the valve comprises a pilot gas chamber having an inlet connectable to a source of pressurised pilot gas, and a displaceable member able to act in concert with a valve member to open and close a gas passage placing the interior of the cylinder in communication with a cylinder gas port in the gas cylinder valve, wherein the displaceable member is normally biased into a valve closing position, but is able to be displaced by the pilot gas pressure against the bias from the valve closing position to a position in which the gas cylinder valve is open. The displaceable member is advantageously a piston or a diaphragm, especially a piston.

In some embodiments, the piston and the valve member may be discrete and separate members. Advantageously, the valve member has opposed ends that are both in communication with the atmosphere. Advantageously, the valve member has a passage therethrough extending from one opposed end to the other.

In certain other embodiments it may be expedient for the piston to be integral with or connected to the valve member.

In some embodiments, the valve member is a spool.

In practice, the displaceable member will preferably be biased. Advantageously, the bias is provided by a spring, preferably a compression spring, and the spring together with the area of the displaceable member and the friction in the seals determines the pilot gas pressure required to move the displaceable member to a position where the valve is in an open position. Advantageously, the pilot gas pressure acts against one face of the displaceable member and the compression spring is seated against the other face of the displaceable member.

In a preferred embodiment a second valve is provided. Advantageously, the second valve comprises a mechanical poppet.

Advantageously, the gas port for exit of gas from the cylinder is positioned at the side of the valve.

Advantageously, the cylinder valve has at its head a tamper-proof cover preventing unauthorised manual access to the displaceable member.

The invention also provides a yoke for engaging with a valve of a gas cylinder, the yoke being able to connect a pilot gas chamber in the cylinder valve to a source of pressurised pilot gas and the cylinder gas port of the gas cylinder valve to an external cylinder gas passage. The yoke may be connectable to a valve of a gas cylinder by any suitable means. Suitable means may include, for example, interengageable structures provided on the yoke and the valve. In one embodiment, the yoke has recessed regions arranged for engaging with cooperating structures on the valve, for example, the valve assembly may have a pair of external locating studs engageable with the yoke.

The yoke of the invention is preferably adapted for use with the valve of the invention. Advantageously, the yoke comprises a pilot gas passage for connecting the pilot gas chamber to a source of pressurised pilot gas and a cylinder gas transport passage for connecting the cylinder gas port to the external cylinder gas passage.

Furthermore, the invention provides an assembly of:
a gas cylinder fitted with a gas cylinder valve able to be opened by application of a pilot gas pressure and including a pilot gas chamber; and
a yoke able to connect the pilot gas chamber to a source of pressurised pilot gas and the cylinder gas port of the gas cylinder valve to an external cylinder gas passage.

Advantageously, the yoke comprises a handle and a connector portion for connection to the cylinder valve, the handle being movable relative to the connector portion from a first position in which the gas cylinder is not locked to the yoke to a second position in which the gas cylinder is locked to the yoke. In a preferred embodiment of the assembly according to the invention, the yoke engages with external locating studs of the gas cylinder valve. In that case, it is advantageous for the yoke to have a pair of arms, both of which have cam surfaces which when the yoke is in position engage the external locating studs. More preferably, the arms are connected to a handle such that operation of the handle causes the cam surfaces to move over the location studs from a first position in which the yoke engages the gas cylinder valve but is not locked thereto to a second position in which the yoke is locked to the gas cylinder valve.

Advantageously, the cam surfaces have, in use, a snail cam action.

In certain preferred embodiments of the yoke according to the invention, the yoke has a pilot gas passage containing a pilot gas valve. Advantageously, the pilot gas valve has a valve member, for example, a poppet, normally biased into a valve closing position, but able to be displaced from the valve closing position by the action of locking the yoke to the gas cylinder valve. In some embodiments of the assembly according to the invention, the cylinder gas port has a nozzle through which extends from a face thereof to the pilot gas chamber a pilot gas conduit, the nozzle being adapted to displace the valve member, for example the poppet, of the pilot gas valve so as to open the pilot gas passage thereby permitting flow of pilot gas from the pilot gas passage to the pilot gas chamber via the pilot gas conduit. Advantageously, the pilot gas passage downstream of the pilot gas valve communicates with a locking chamber in the yoke, gas pressure in the locking chamber urging a retractable stop into a position in which it is received in a complementary aperture in one of the said arms so as to lock the yoke in said second position to the gas cylinder valve. For example, one or both of the said arms of the yoke may have, as a said aperture, a detent which when the cam surfaces are in said second position engages a spring loaded ball or a biased elongate element carried in the yoke constituting a said retractable stop.

In one especially preferred embodiment described below, a stop feature in the middle of the snail cam prevents the possibility of the user pressing the valve and making a connection without the cylinder being locked in place, thus preventing release of pressure that could make the cylinder jump out of the yoke.

The snail cam can give a very large mechanical advantage, so small force on the handle gives very strong force to push the valve connections together.

Within the motion of the snail cam, connections can be made on attachment, and un-made on detachment, so that the cylinder can be attached and removed safely. In certain preferred embodiments, some of which are described below and in which nitrous oxide is typically the gas to be delivered from the cylinder and oxygen is typically the pilot gas, when the cylinder is pushed into the yoke, none of the connections are made, and the protruding portion in the middle means they cannot be unless the user starts to turn the handle. As the handle starts to turn to lock the cylinder in place:
1. The cylinder is locked. All the connections are un-made and the poppet is not actuated.
2. The $N_2O$ connection is made (pilot connection not made, poppet not actuated).
3. The pilot gas connection is made (poppet not actuated).
4. Poppet actuated.
5. On detachment, as the handle is turned:
6. Poppet closed (so gas to pilot is off)
7. $O_2$ connection is un-made, so pilot gas is vented (this will turn off and vent the $N_2O$)
8. $N_2O$ connection is un-made
9. Cylinder is free to be removed.

This sequence gives a great advantage in the safety of making the connection.

Other sequences of operation within the movement of the cam are possible.

Preferably, the gas cylinder valve has a pair of guide flanges to facilitate location of the yoke.

In one advantageous embodiment of the invention, the cylinder is a nitrous oxide cylinder.

The valve of the invention, especially when used with a yoke according to the invention, may be used to improve the tamper-resistance of a gas cylinder, especially a nitrous oxide cylinder for use in an $N_2O/O_2$ mixing system. In particular, the system is advantageously arranged in such a way that the supply of $N_2O$ out of the cylinder is initiated only if the cylinder valve is attached to the yoke and the presence of the second gas (oxygen in the case of an $N_2O/O_2$ mixing system) is detected in the valve in the form of the existence of the pilot gas pressure.

Thus, in a preferred embodiment, the invention provides a nitrous oxide supply system comprising a gas cylinder containing nitrous oxide fitted with a gas operated valve in which a pressure of a further gas is required to be present at the valve before the delivery of $N_2O$ is initiated.

The term "pilot" is used herein, with reference to a gas, to refer to a supply of gas that is subsidiary to, but indicative of the presence of, a main supply of the gas. The term "pilot gas pressure" is analogously used herein to refer to a gas pressure generated by a pilot gas supply that is indicative of the presence of a pressurised source of the gas.

BRIEF DESCRIPTION OF THE DRAWINGS

Certain illustrative embodiments of the invention are explained in detail below with reference to the accompanying drawings, in which.

DETAILED DESCRIPTION OF THE INVENTION

Figure 1:
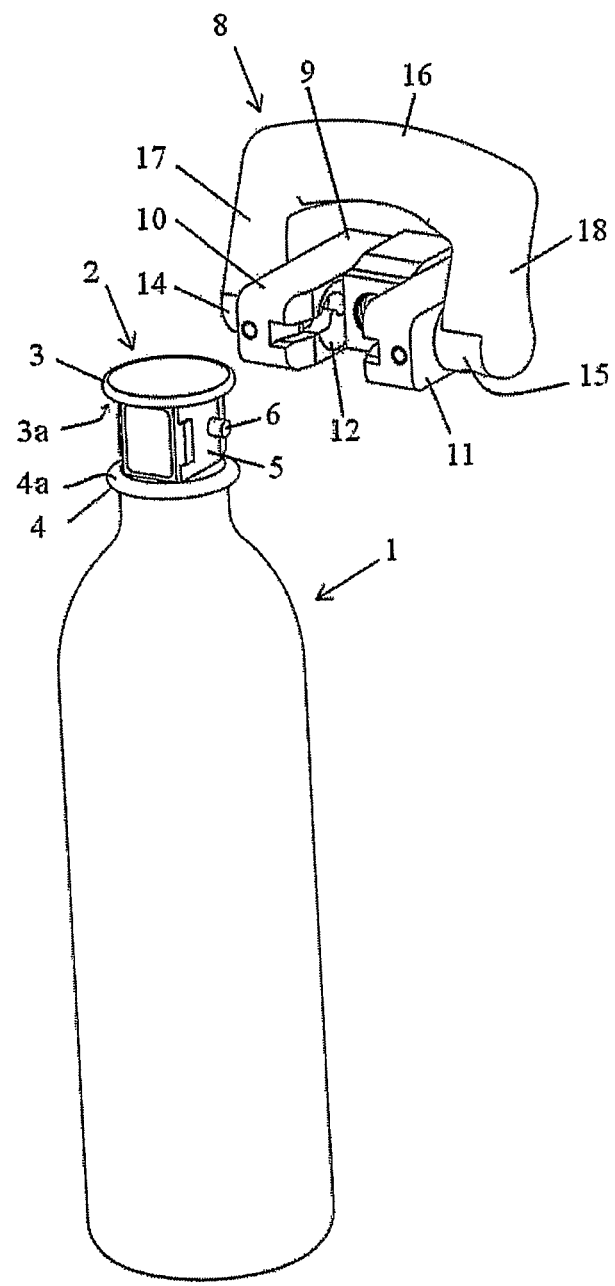
FIG. 1 is a perspective view of an assembly according to the invention, having a gas cylinder connected to a valve assembly, and further having a yoke.

With reference to FIG. 1, a cylinder 1 is fitted with a cylinder valve 2. The cylinder may advantageously contain nitrous oxide, although it is to be understood that the cylinder 1 may contain any gas that is to be used in admixture with a gas from another cylinder. For example, in the case of nitrous oxide, the gas is mixed with a gas from another source and supplied for its intended use, which in the case of nitrous oxide is advantageously use, in admixture with oxygen, for anaesthetic purposes.

The valve 2 has an upper flange 3 with a flange lower guide face 3a, and a lower flange 4 with a flange upper guide face 4a. Between the upper flange 3 and lower flange 4 the valve is of generally rectangular configuration in horizontal cross-section. On side face 5 of the valve assembly there is provided a protruding external locating stud 6. A similarly configured locating stud 7 is arranged on the opposite face of the valve assembly but is not visible in FIG. 1.

Additionally shown in FIG. 1 is a yoke 8, the purpose of which is to connect a pilot gas chamber in the valve to a source of pressurised pilot gas and the cylinder gas port of the gas cylinder valve to an external cylinder gas passage The yoke 8 has a connector portion 9 comprising opposed clamp arms 10, 11 which are so spaced apart that the yoke is engageable with the valve assembly 2 with the clamp arms 10,11 embracing the valve assembly. As will be described in more detail below with reference to FIG. 3 the clamp arm 10 includes a through-hole in which there is rotatably received a cam arm 12 including a snail cam engageable with the locating stud 7 when the yoke 8 is fully engaged with the cylinder valve 2. A further cam arm 13 is similarly rotatably mounted in a through-hole in the clamp arm 11. The through-holes in the clamp arms 10, 11 are coaxial. The cam arm 13 is configured to have a mirror image configuration relative to the cam arm 12. Each of the cam arms 12, 13 is provided with an extension 14, 15 protruding outwardly from the respective clamp arm. A cam handle has a grip portion 16 and arms 17, 18 extending laterally from the grip portion 16 at opposed ends thereof. The arm 17 is attached to the extension 14 and the arm 18 is attached to the extension 15. The cam handle is pivotable from the position shown in FIG. 1 to a lower position in which the grip portion 16 is in the vicinity of the cylinder wall (as shown in, for example, FIG. 6). That pivoting is made possible by means of rotation of the cam arms in the clamp arms 10, 11.

Figure 2:
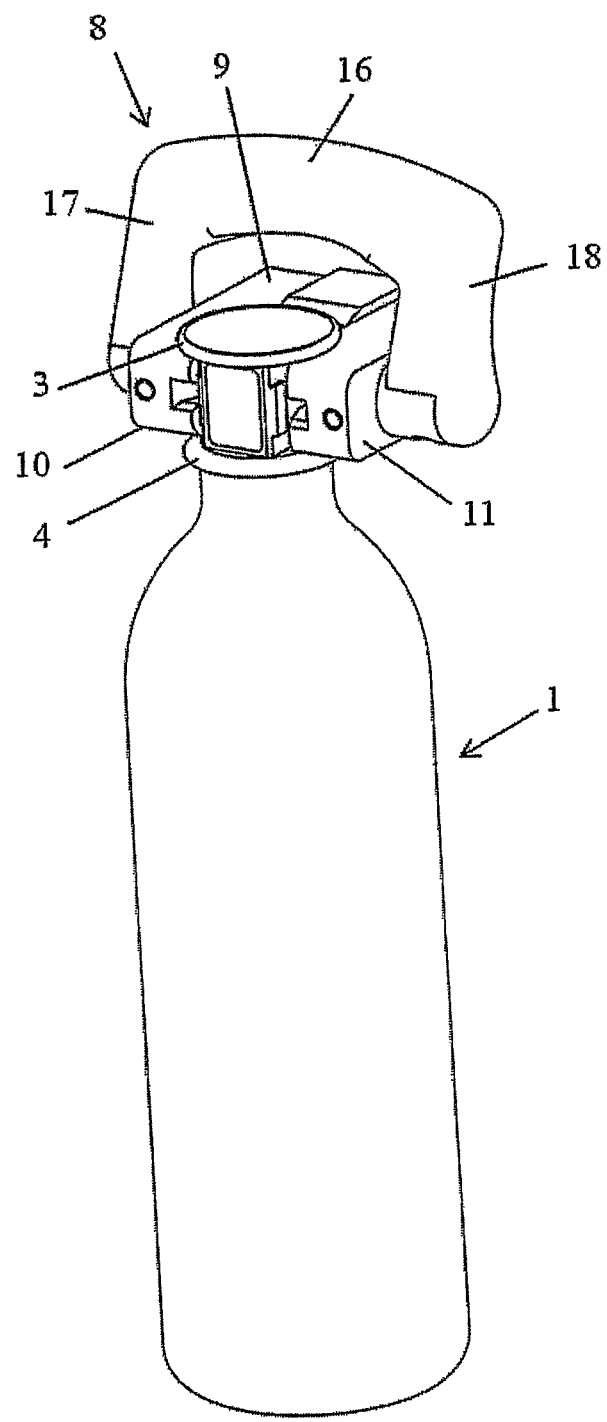
FIG. 2 shows the cylinder and valve of FIG. 1 with the yoke, before clamping into position.

In FIG. 2, the yoke 8 is shown in engagement with the cylinder valve 2, the studs 6, 7 received in the cam arms 12, 13. The cam handle is directed upwards, and in that position the yoke 8 is not clamped to the valve 2.

Figure 3:
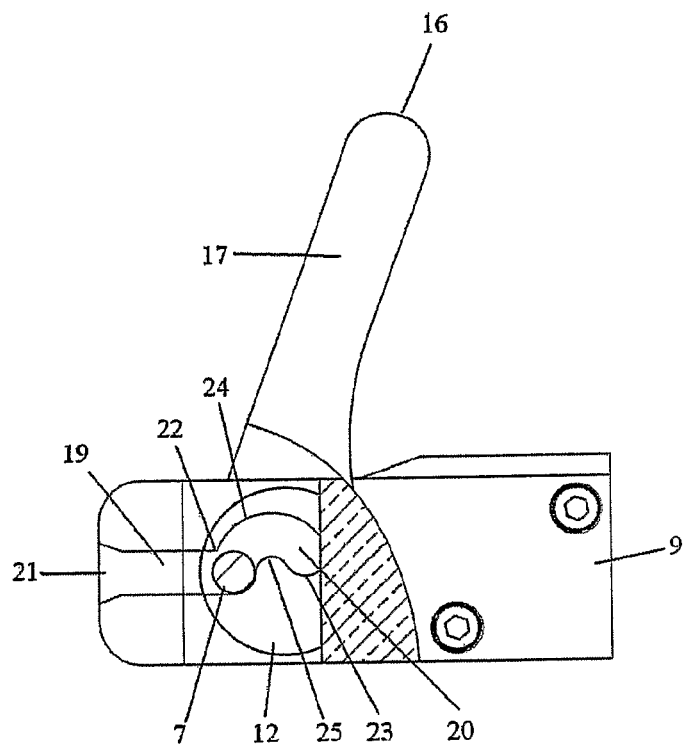
FIG. 3 is a side view of the yoke, shown partly in section.

FIG. 3 is a vertical section through the yoke 8, showing the inner side of cam arm 12. The construction of only the cam arrangement in the cam arm 12 is described in detail below, but it is to be understood that the cam arrangement in the cam arm 13 is similarly constructed in mirror-image relationship. With reference to FIG. 3, the inner end surface of the cam arm has a cam arrangement, which operates in snail cam manner.

The cam arrangement has a channel having an entrant portion 19 and an inner portion 20. The entrant portion 19 is a straight channel extending horizontally along the inner surface of the clamp arm. An enlarged mouth 21 is provided at the inlet to the entrant portion 19, serving to guide the connector portion 9 onto the studs 6, 7. The inner portion 20 consists of a curved region of channel and a straight region 22, the curved region communicating directly with entrant portion 19 via the straight region 22 when the cam arm 12 is in the position shown in FIG. 3. The other end 23 of the curved region is closed by an end wall. The curved channel region has an upper wall defining an arcuate cam surface 24 and a lower wall which forms a protrusion 25 which is positioned to obstruct the path of an object in the event of relative movement horizontally of the object within the entrant portion 19. That configuration has the advantage that, unless or until the cylinder is locked into the yoke, the connection between the valve and connector cannot be made. The inner portion 20 is wholly located within the surface of the cam arm 12. The inner portion 20 and in particular the cam surface 24 are so configured that, on rotation of the cam arm 12 around a central axis of the cam arm by means of rotation of the handle in an anticlockwise direction in the view shown in FIG. 3, the connector portion 9 is moved relative to the cylinder valve 2, with the connector portion being guided by means of the cooperation of the pins 6, 7 of the cylinder valve with the cam surface 24 of cam arm 12 and corresponding cam surface of cam arm 13.

Figure 4:
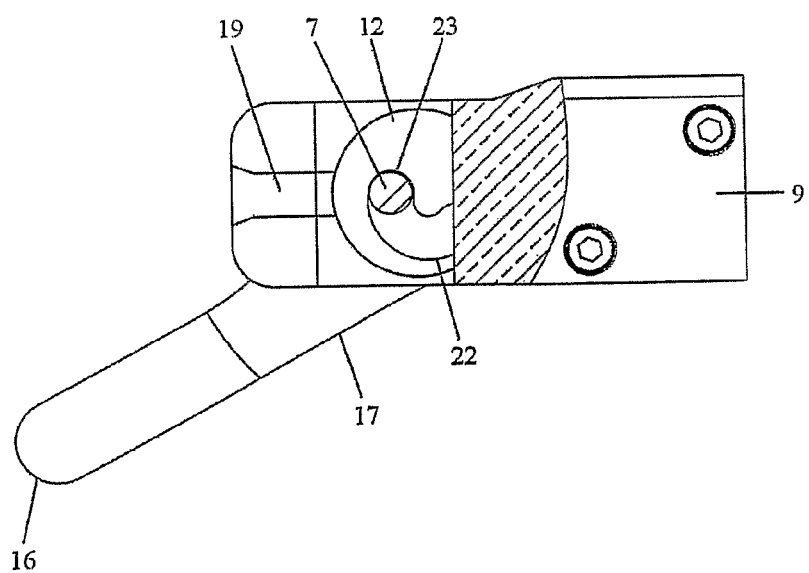
FIG. 4 is a side view of the yoke, partly in section, with a handle in a clamping position.

FIG. 4 shows the handle in a lowered position in which the connector portion 9 is clamped to the cylinder valve 2. On rotation of the cam arm 12, the connector portion 9 has been so moved, by means of cooperation of the cam surface 24 of the yoke 8 and the pin 7 of the valve (and corresponding cam surface of cam arm 13 and the pin 6), that a gas connection arrangement in the connector portion 9 is brought into communicatable relationship with the valve 2. In this position, the pin 7 is located at the closed end 23 of the curved region of inner portion 20. The connector portion 9 may be locked in position by any suitable arrangement, for example by means of a recess provided in the cam arms 12, 13 to receive a biased detent element, as described further below with reference to FIG. 8 or FIGS. 9a and 9b. It will be appreciated that the pin 7 is shown in FIGS. 3 and 4 for ease of explanation, whilst the remainder of the valve is omitted for the sake of clarity.

Figure 5A:
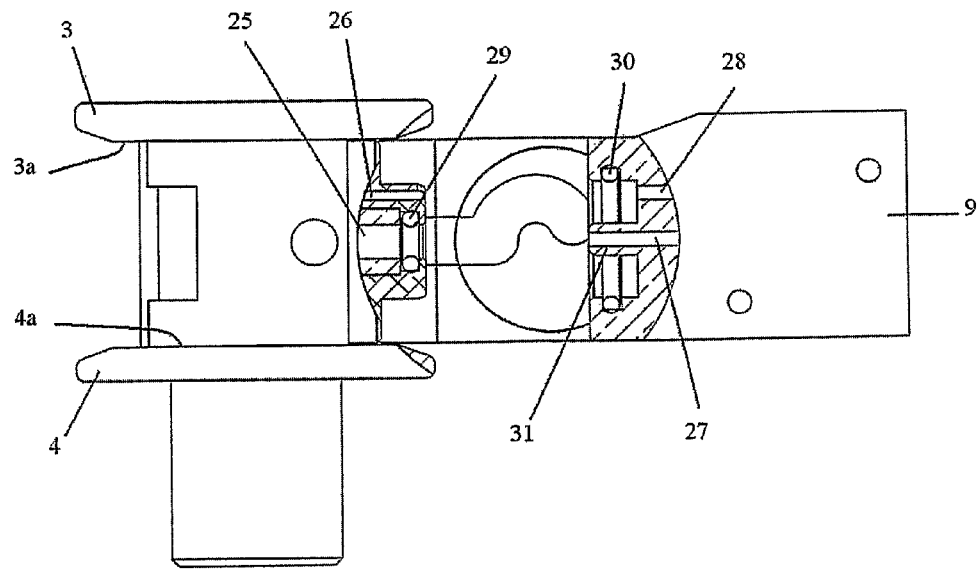
FIG. 5a is a side view of the valve assembly and yoke before connection.
Figure 5B:
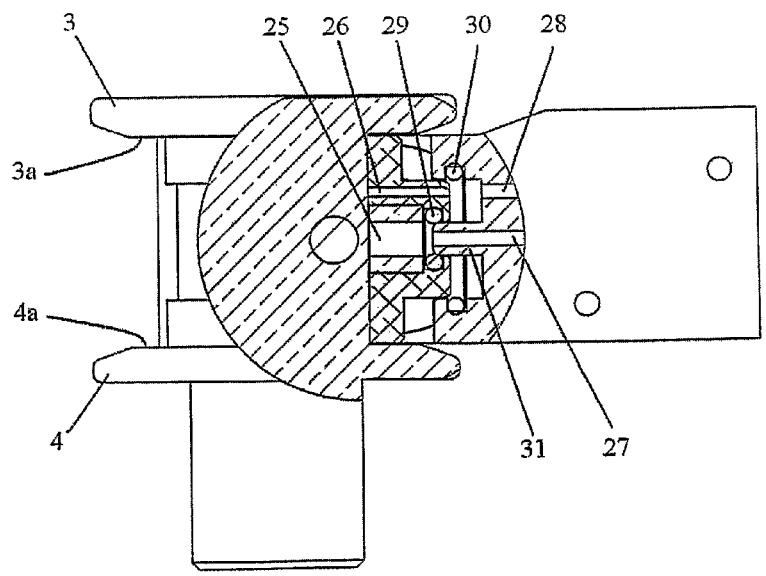
FIG. 5b is a side view of the valve assembly and yoke during an initial stage of connection.
Figure 5C:
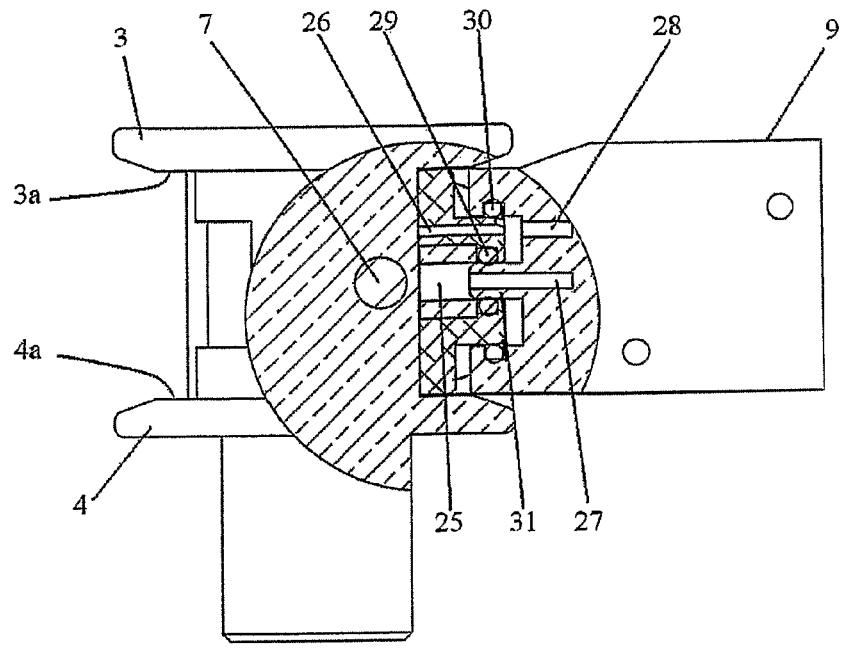
FIG. 5c is a side view of the valve assembly and yoke during a final stage of connection.
Figure 5D:
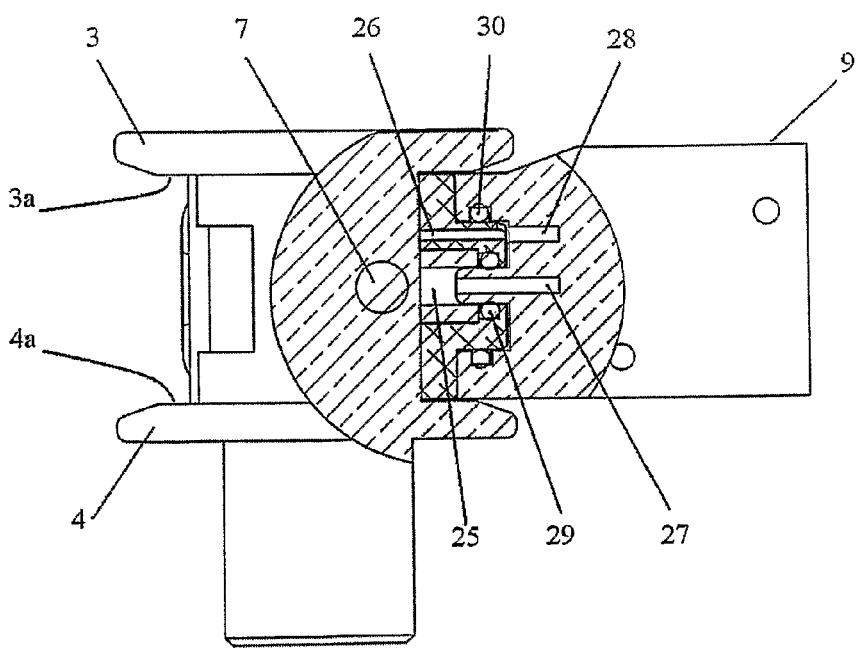
FIG. 5d is a side view of the valve assembly and yoke after connection.

The affixing of the connector portion 9 to the valve 2 is shown in FIGS. 5a to 5d, each of which is partly in section. In FIG. 5a, the yoke 8 is brought towards the valve assembly, with the clamp arms 12, 13 aligned with and between the upper and lower flanges 3, 4 of the valve, and embracing the valve between them. The handle (not shown) is in the up position. There are shown schematically in FIGS. 5a to 5d a cylinder gas supply passage 25 and pilot gas inlet passage 26 in the valve 2 and a cylinder gas transport passage 27 and a pilot gas passage 28 in the connector portion 9. At the outlet port of the cylinder gas supply passage 25 there is provided a sealing ring 29. A further sealing ring 30 is provided in the connector portion 9. The cylinder gas transport passage 27 terminates at a nozzle 31 which is dimensioned and configured to be sealably joined to the end of the cylinder gas supply passage 25. FIG. 5b shows the connector portion 9 located around the valve assembly, but the handle (not shown) is still in the up position so that clamping has not yet been effected. In FIG. 5c, the handle (not shown) is part way through lowering to the downward position, drawing the connector portion 9 against the valve assembly 2 and inserting the nozzle 31 through the sealing ring 29 into cylinder gas supply passage 25. Simultaneously, a wider, nozzle arrangement comprising both the cylinder gas port terminating the cylinder gas passage 25 and the pilot gas inlet passage 26 advances through, and forms a seal with, sealing ring 30. In FIG. 5d, the handle (not shown) is in the downward position, with the connector portion 9 firmly engaged with the valve assembly such that the cylinder gas transport passage 27 is in communication with the cylinder gas supply passage 25, and the pilot gas passage 28 is in communication with the pilot gas inlet passage 26.

Figure 6:
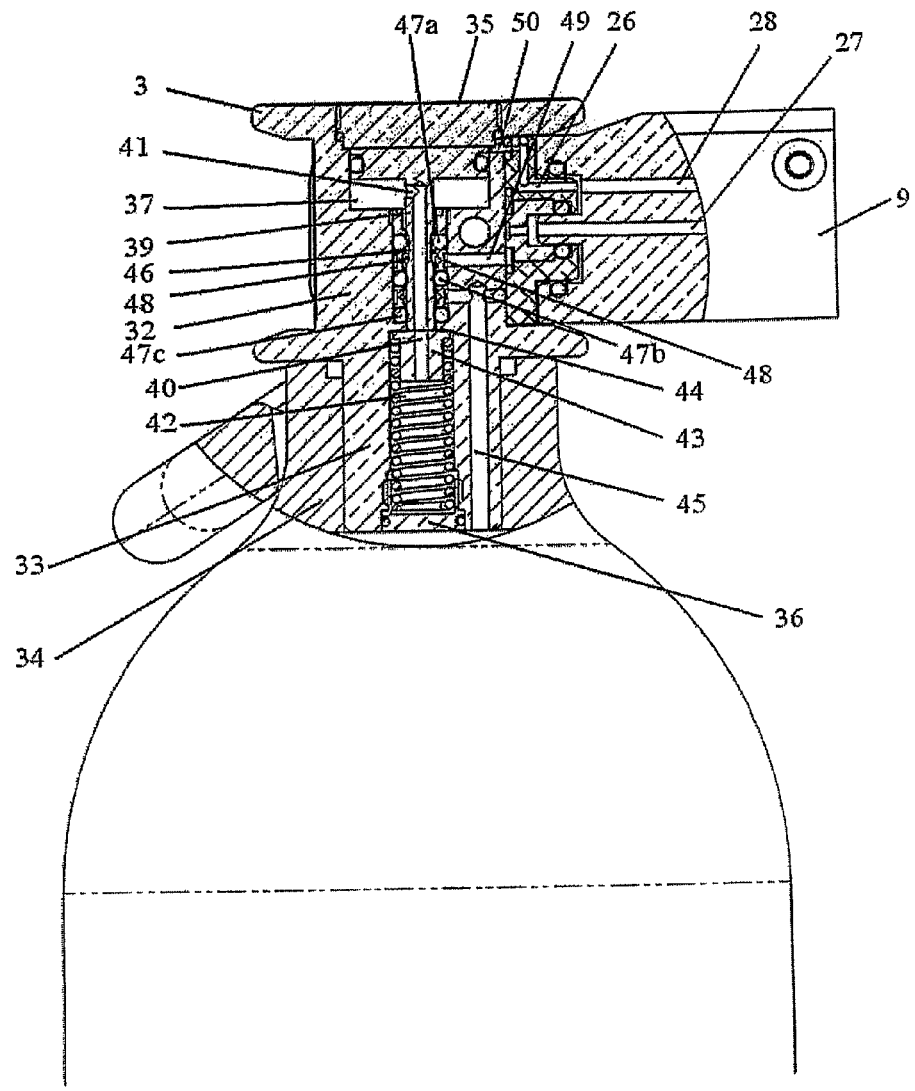
FIG. 6 is a side view of a further assembly according to the invention, shown partly in section, when there is no pilot gas pressure.

A first illustrative embodiment of valve assembly 2 is shown in FIG. 6, attached to a yoke 8 of the kind shown in FIGS. 5a to 5d. The valve assembly 2 has a body 32, a lower part 33 of which is engageable in the mouth 34 of a gas cylinder 1. As mentioned above, the valve assembly includes an upper flange 3 and a lower flange 4, defining between them the region in which the valve assembly is engageable with the connector portion 9. Extending vertically through the body 32 is a bore, which is closed at its upper end by a sealed cap 35 and at its lower end by sealed cover 36. The bore consists of a number of portions of varying diameter. At the top, adjacent to the cap 35, is the region of largest diameter, forming piston chamber 37. Extending downwardly from the piston chamber 37 is a central region housing a valve arrangement generally of the sliding-spool type. Beneath the central region is a lower bore region, which is of greater diameter than the central region and houses a return spring arrangement. The piston chamber 37 houses a piston 38 which is vertically displaceable within the chamber. The piston is connected with a piston stem 39, which is connected to a spring arrangement housed in the lower bore region. The piston stem 39 includes a longitudinal passage 40 having a vent 41 into piston chamber 37 to allow there to be a certain pressure of cylinder gas in the piston chamber. The chamber 37 is vented to the external atmosphere in such a manner as to allow the gas in the system to vent part way through the lifting of the handle. That reduces the risk of the cylinder jumping on disconnection but also allows for there to be some pressure in chamber 37 to aid the piston moving to a closed position. The spring arrangement has a compression spring 42, the lower end of which is supported on the cover 36. At the upper end of the spring is a spring head 43, a lower extension of which is received within the upper coils of the spring. When the spring is in its maximum permitted state of extension, the spring head 43 abuts against a shoulder 44 at the narrower entrance to the central region of the bore.

A second, narrower, bore 45 is provided in the body 32 extending from the lower face of the body vertically upwardly to a position generally level with the central bore region, and thence transversely to an inlet into the bore wall in the central bore region.

In the central region of the bore there is a spool valve arrangement which serves to permit gas to pass from the cylinder into the connector portion 9 when the presence of another gas supply, for example from another gas cylinder or a wall socket, is detected. The piston stem 39 extends vertically through the entirety of the central region of the above. In that region, the piston stem 39 has a narrowed region 46. Three sealing rings 47a, 47b, 47c are provided, vertically spaced from one another, in the central bore region, surrounding the piston stem. The piston stem is a snug fit within the sealing rings except in the narrowed region 46 in which the diameter of the piston stem is smaller than the internal diameter of the sealing rings 47a, 47b, 47c. The sealing rings are maintained in vertically spaced relationship by means of seal spacers 48. In the embodiment of FIGS. 5a to 5d, the piston may, instead of the narrowed region 46, be provided with elongate slots, which offer the advantages of reduced friction and reduced damage to the sealing rings, particularly at high pressure.

A horizontal passage 49 extends across the body 32 from the central bore region for carrying the cylinder gas via cylinder gas passage 25 (which is only partly visible in FIG. 6) to the cylinder gas outlet port. The connector portion 9 is generally of the construction described with reference to FIGS. 5a to 5d. When the connector portion is locked in place, the passage 49 is in communication via the passage 25 to the cylinder gas transport passage 27 of the connector portion 9

The pilot gas inlet passage 26 communicates, via an inlet 50, with the upper part of the piston chamber 37.

Figure 7:
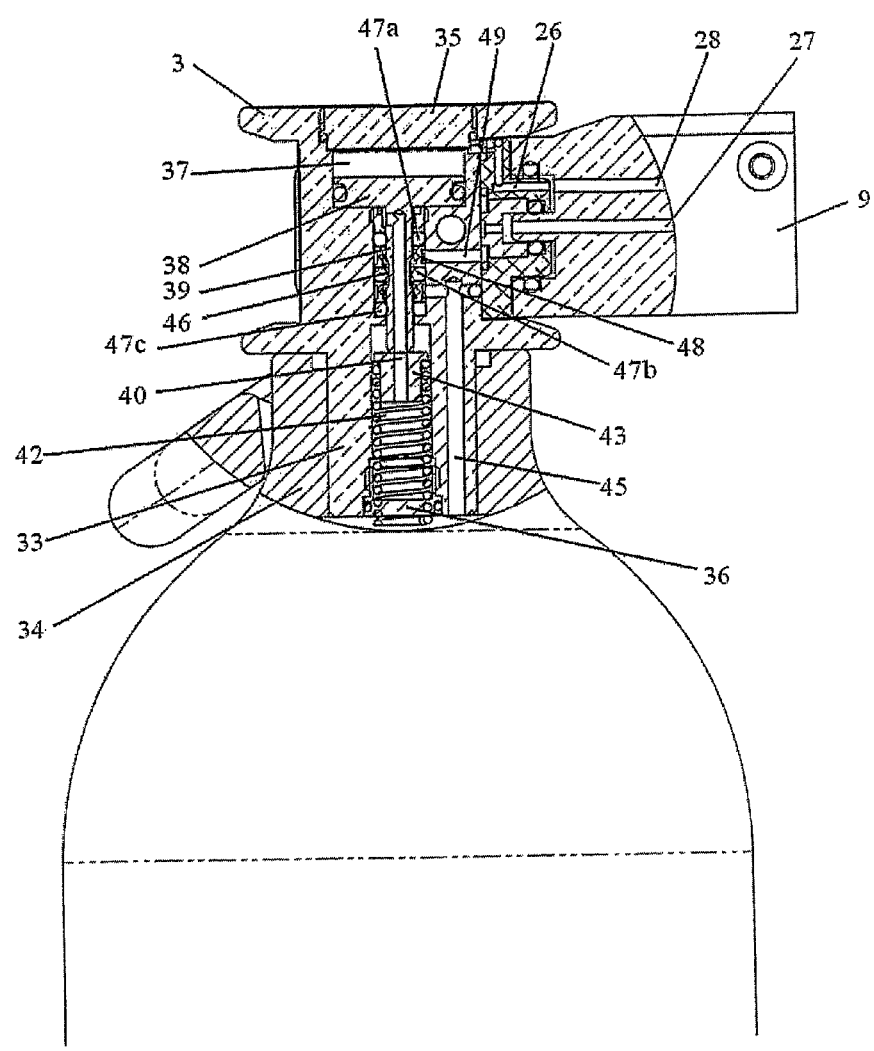
FIG. 7 is a side view of the assembly of FIG. 6, partly in section, when there is a pilot gas pressure present.

When a second pressurised gas source, for example, an oxygen source, is connected to the pilot gas passage 28, causing a flow of pilot gas along the passage 28, pilot gas enters the piston chamber 37 above the piston head 38 and, when sufficient pressure builds up, the piston head is forced downwardly against the biasing spring 42, as shown in FIG. 7. As a result of the downward movement of the piston 38 and the attached stem 39, the region of narrowing 46 is displaced downwardly (see FIG. 7) with the result that a gas flow channel is created between the outlet of vertical conduit 45 and the horizontal channel 49, allowing cylinder gas to flow uninterruptedly into the cylinder gas transport passage 27.

Figure 8:
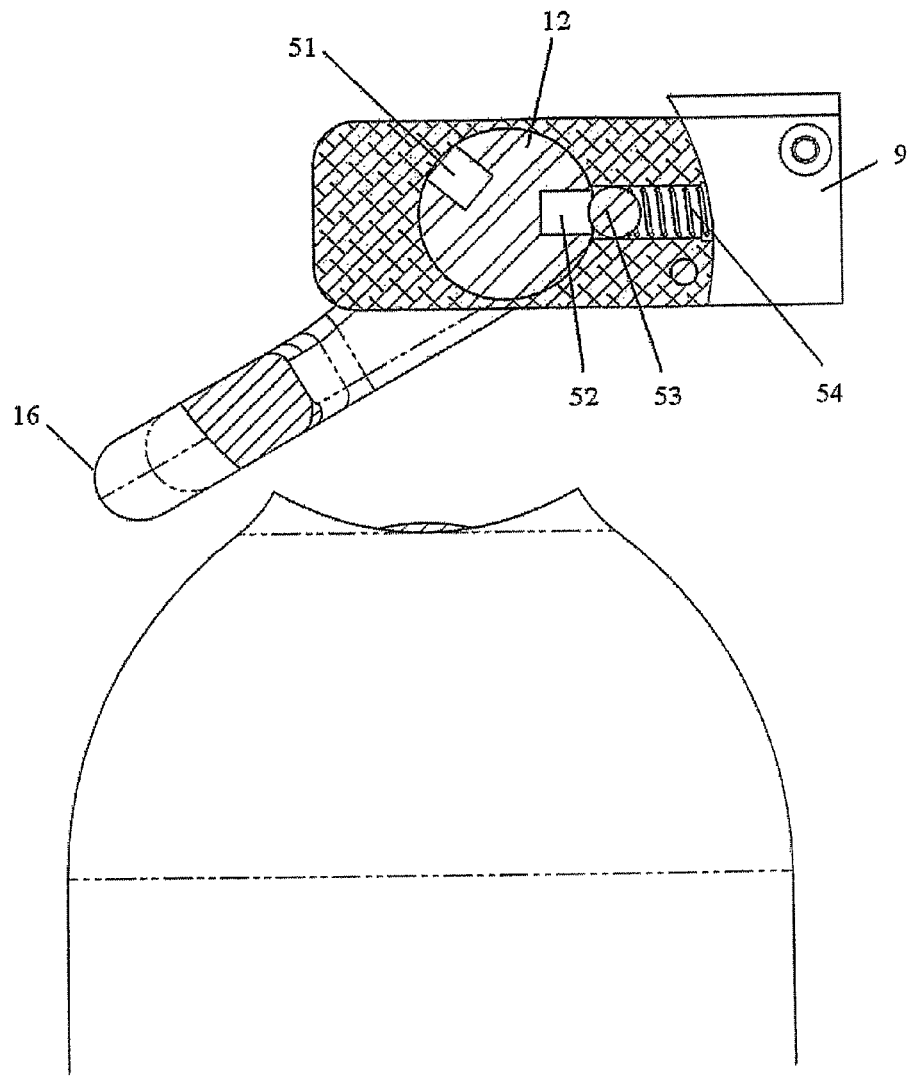
FIG. 8 is a vertical section through an arm of a yoke with a first detent arrangement.

FIG. 8 shows schematically a first detent arrangement for indicating correct location of the yoke 8 on the valve assembly 2. Recesses 51, 52 are provided in the circumferential surface of the cam arm 12. A detent ball 53, mounted on a compression spring 54, is able to engage selectively in either the recess 51 or the recess 52, according to the rotational position of the cam arm (and associated handle). The compression spring is mounted within a bore in the connector block assembly, and bears on the inner end wall of the bore. When the handle is so positioned that the detent ball is opposite one of the recesses 51, 52, the spring loaded detent ball automatically engages in that recess, indicating to the user that the handle is correctly positioned in the clamping position or the release position, respectively. The arrangement is such that withdrawal of the detent ball from the recess is permitted when the user moves the handle away from the clamping or release position, respectively.

Figure 9A:
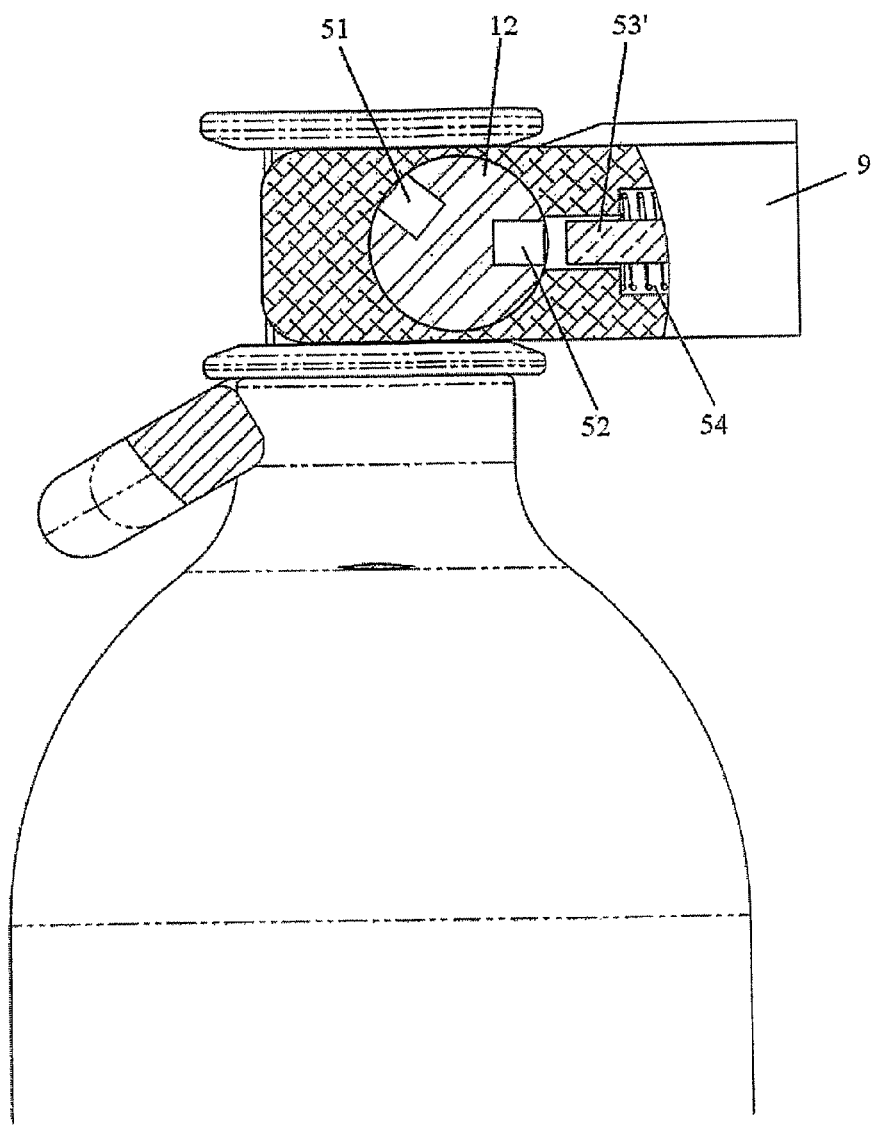
FIG. 9a is a vertical section through an arm of a yoke with a pressure actuated locking arrangement, when there is no pilot gas pressure in the yoke.
Figure 9B:
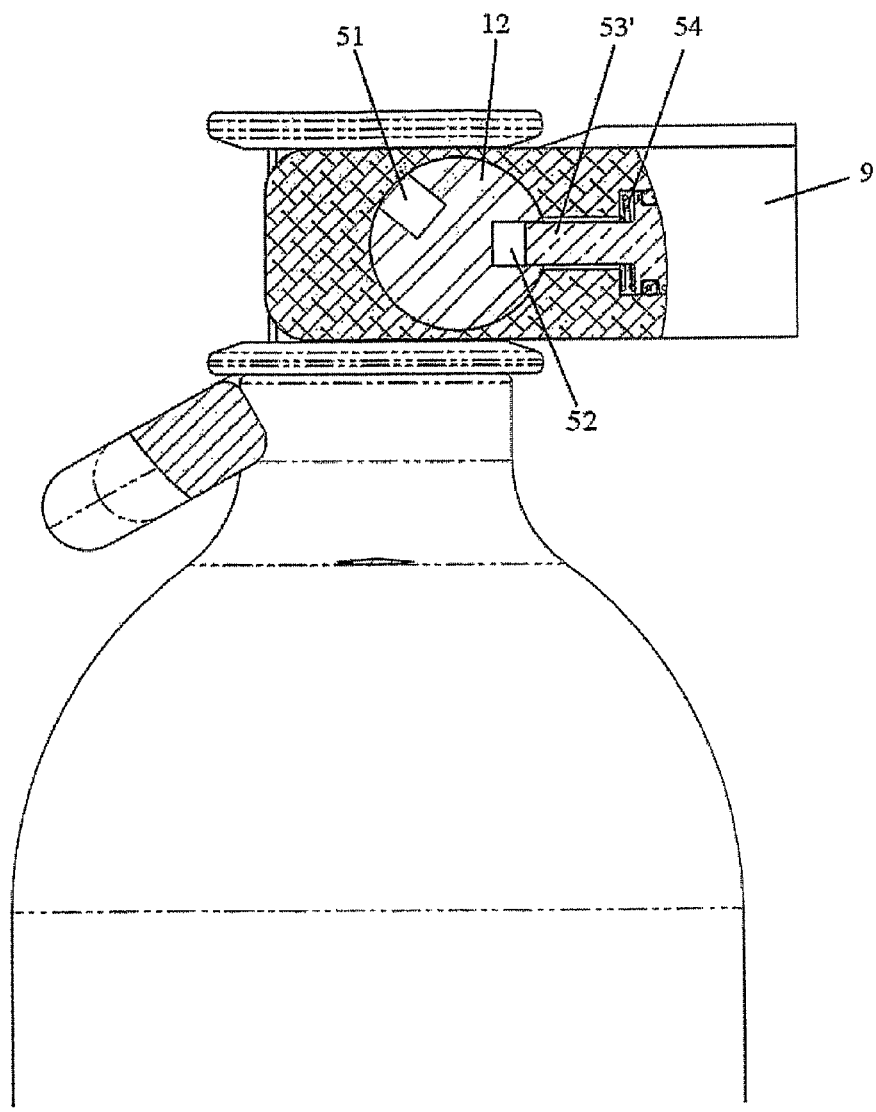
FIG. 9b is a vertical section through the yoke arm of FIG. 9a, when there is a pilot gas pressure in the yoke.

FIGS. 9a and 9b show a detent arrangement in which the detent ball of FIG. 8 is replaced by an elongate element 53' that can engage in the recesses 51, 52 (see FIG. 9b). The elongate element is automatically displaced outwardly to engage in the detent 52 when there is a pilot gas pressure in the yoke, with the spring 54 serving to retract the piston when there is no pilot gas pressure. The connection portion 9 can be disengaged only when there is no pilot gas supply.

Figure 10:
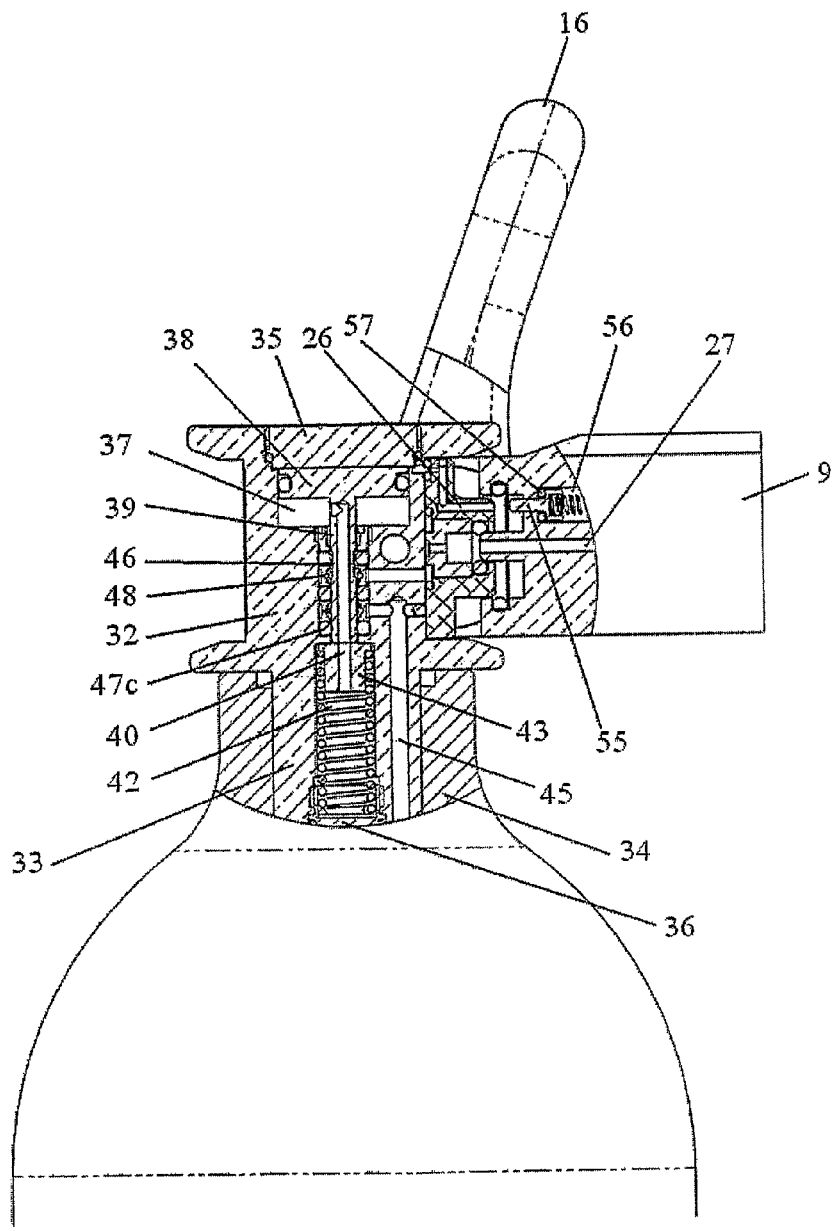
FIG. 10 is a side view of a further assembly according to the invention, in which a pilot gas valve is present in a pilot gas passage of the yoke, before clamping of the yoke to the valve.
Figure 11:
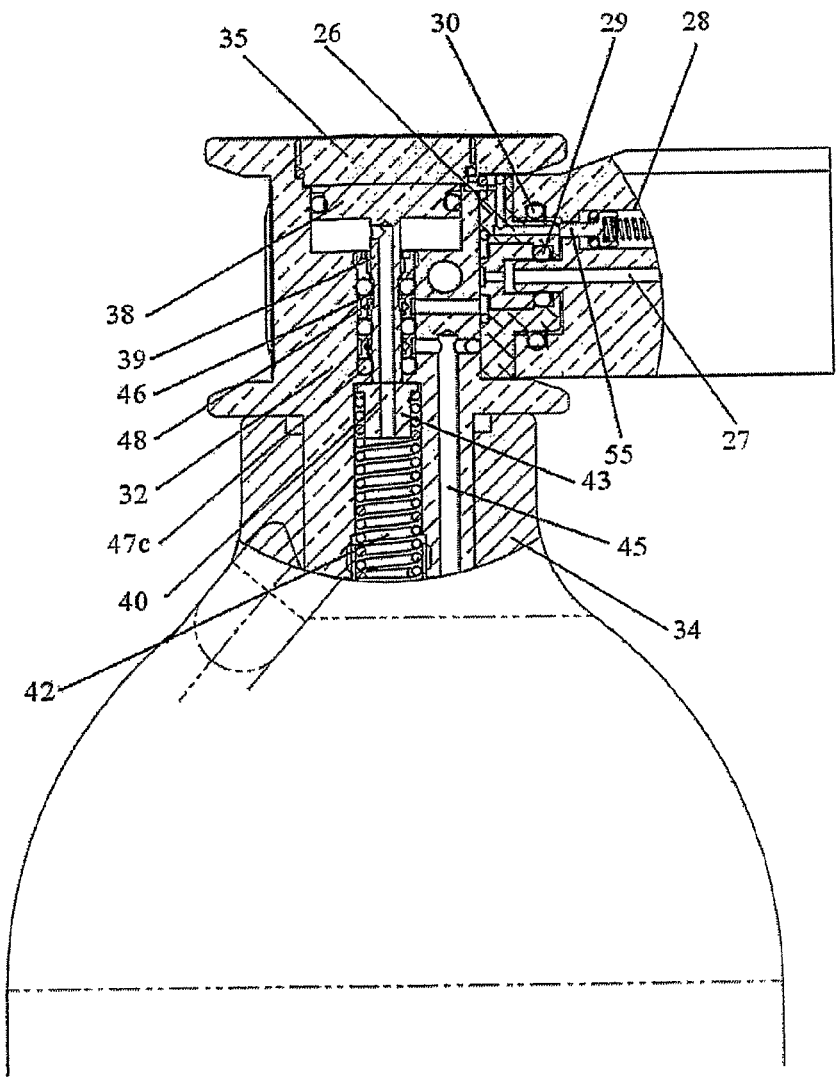
FIG. 11 shows the assembly of FIG. 10, with the yoke clamped to the valve.

In FIG. 10, there is shown an embodiment in which the pilot gas passage in the yoke 9 includes a pilot gas valve in the form of a poppet valve. The poppet valve closes the pilot gas passage 28 when the connector portion 9 is not attached to the valve assembly 2. A poppet 55 is mounted at the front end of a poppet closure spring 56, which bears against a bearing surface (not shown) within the conduit 28. The poppet is normally biased by spring 56 into a valve closing position, in which poppet 55 is snugly located within a seal 57, but is able to be displaced from the valve closing position by the action of locking the yoke 8 to the gas cylinder valve 2. The poppet valve is opened by means of the protruding nozzle arrangement of the valve assembly 2 which, on advancing the connector portion 9 towards the valve assembly, forces the poppet back through the valve seat against the return force of the spring 56. FIG. 11 shows the poppet in the open position just after application of a pilot gas pressure, and before commencement of the lowering of the piston head 38. In a variant of the embodiment of FIGS. 10 and 11, the poppet may be displaced by an appropriately located pin instead of by the nozzle arrangement.

In use of a yoke having a poppet valve as described above, as the handle starts to turn to lock the cylinder in place:
1. The cylinder is locked. All the connections are un-made and the poppet is not actuated.
2. The $N_2O$ connection is made (pilot connection not made, poppet not actuated).
3. The pilot gas connection is made (poppet not actuated).
4. Poppet actuated.
5. On detachment, as the handle is turned:
6. Poppet closed (so gas to pilot is off)
7. $O_2$ connection is un-made, so pilot gas is vented (this will turn off and vent the $N_2O$)
8. $N_2O$ connection is un-made
9. Cylinder is free to be removed.

Such an arrangement, connected and unconnected according to the above sequence, gives great advantages in the safety of making the connection.

FIGS. 12 to 15 show a number of further illustrative forms of valve assembly.

Figure 12:
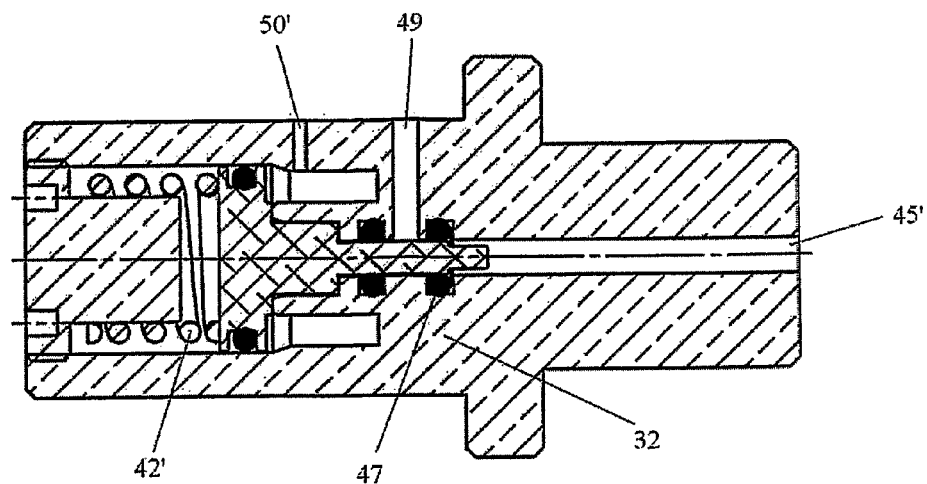
FIG. 12 is a section through another form of valve in accordance with the invention.

The valve assembly of FIG. 12 is similar in some respects to that described above with reference to FIG. 6. In the arrangement of FIG. 12, however, the return spring for the piston acts directly on the piston and a valve arrangement is actuated by the piston in order to open and close the flow of cylinder gas. Additionally, a circular projection is provided on the upper surface of the piston. That can reduce any tendency of the piston to stick to the upper wall of the piston chamber 37, potentially making the piston more responsive to the arrival of the pilot gas into the chamber.

Figure 13:
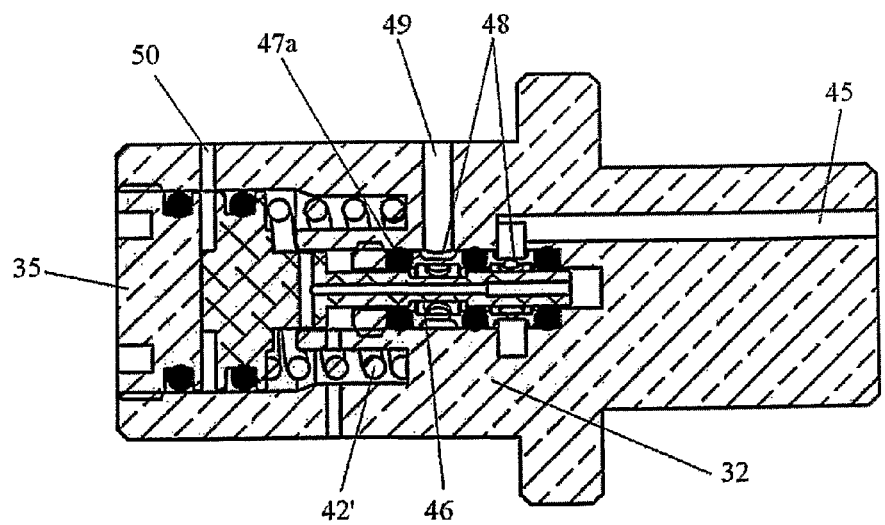
FIG. 13 is a section through a further form of valve according to the invention.
Figure 14:
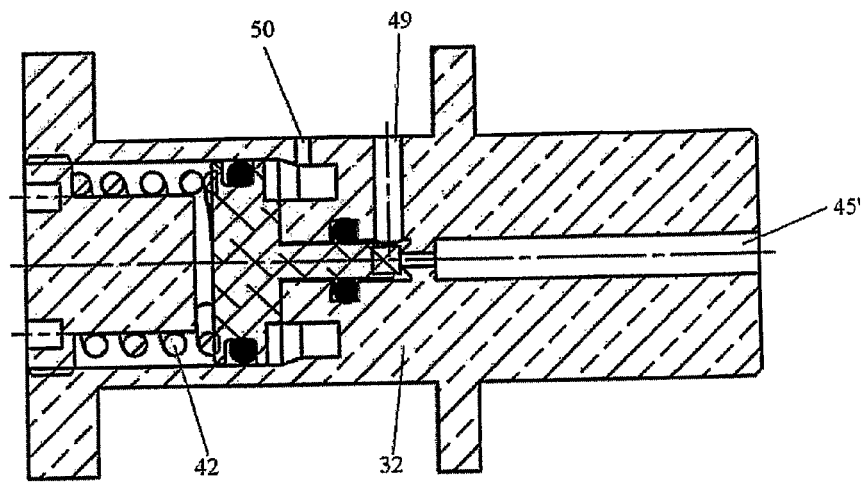
FIG. 14 is a section through yet another form of valve according to the invention.
Figure 15:
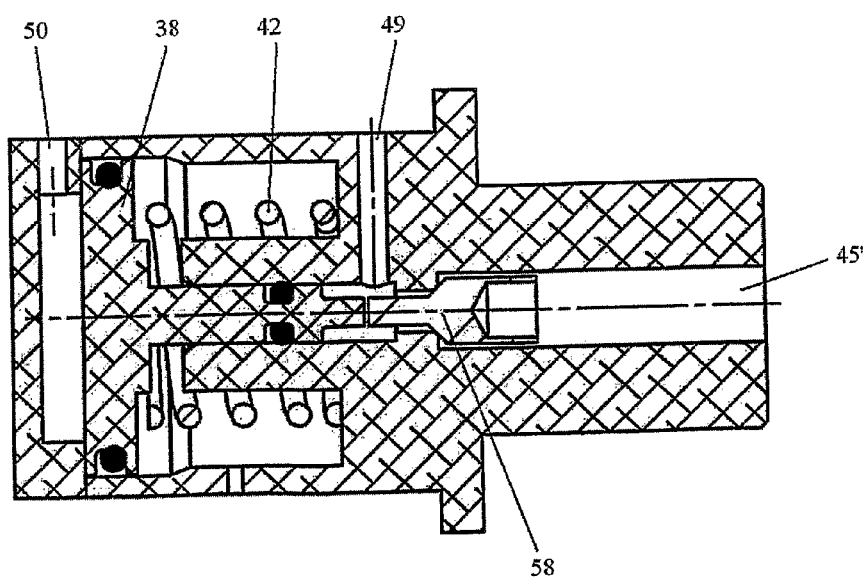
FIG. 15 is a section through further illustrative embodiment of valve according to the invention.

FIG. 13 shows a valve assembly in which the piston operates in the opposite direction, the oxygen being admitted on top of the piston and urging the piston downwards against a spring below, thereby opening the cylinder gas passage. FIG. 14 shows a variant on the arrangement of FIG. 13, in which the cylinder gas passage is provided by lifting the piston (by means of admission of pilot gas) such that the lower extremity of the stem clears the valve seat. FIG. 15 shows an arrangement in which oxygen enters the piston chamber above the piston, the descent of which, by virtue of a poppet valve arrangement 58, opens a passage for the nitrous oxide. The poppet valve 58 may include a return spring (not shown in FIG. 15).

Figure 16:
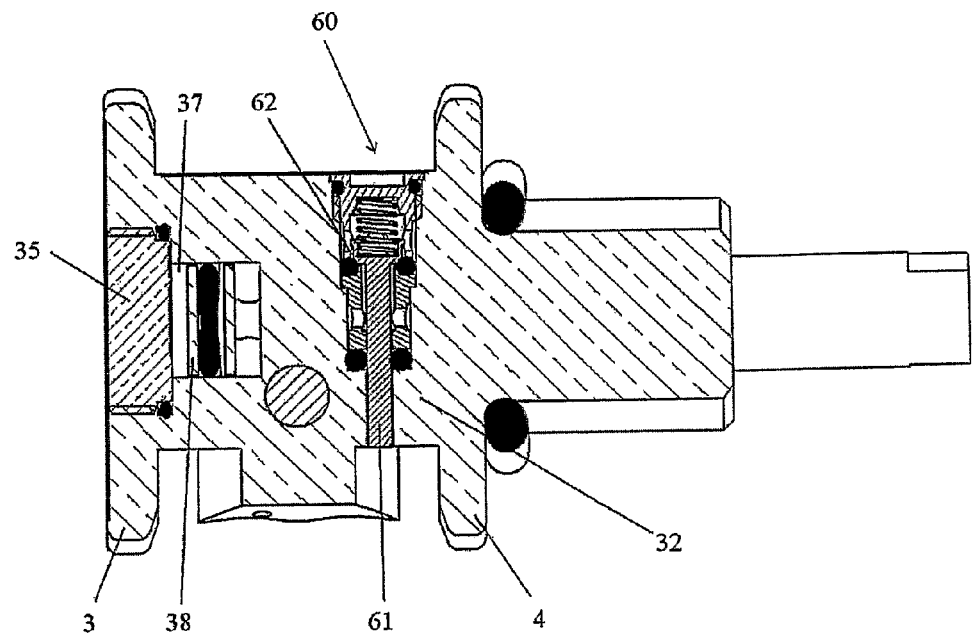
FIG. 16 is a sectional view of an especially preferred form of valve according to the invention including a mechanical poppet arrangement for opening and closing the supply of cylinder gas.

In an advantageous embodiment shown in FIG. 16, a second poppet valve 60 may be added between the connector portion 9 and the valve assembly 2. The poppet valve 60 operates in a generally similar manner to the poppet valve 55 provided in the connector block assembly in connection with the oxygen supply conduit. In the case of the poppet valve 60, however, the poppet is provided in the valve assembly in connection with the supply conduit for cylinder gas from the cylinder 1, and is operable to open and close the feed of the cylinder gas into the spool valve, thus providing a second valve between the cylinder and the yoke. The poppet valve is opened by means of longitudinal displacement of poppet 61 by means of a cooperating actuating structure, for example a pin, provided on the connector portion 9, thereby allowing cylinder gas to flow out of the cylinder through valve seat 62 when the connector portion 9 is connected to the valve assembly. For there to be a flow of cylinder gas through the valve assembly 2 into the connector portion 9, both the poppet valve 60 and the main valve arrangement must be open. The poppet valve 60 adds additional security. In this arrangement, the passage for carrying cylinder gas from the cylinder to the spool valve is arranged on the opposite side of the valve from the outlet port to provide for location of the poppet valve upstream of the spool valve. This is operated by a corresponding pin on the yoke.

Figure 17:
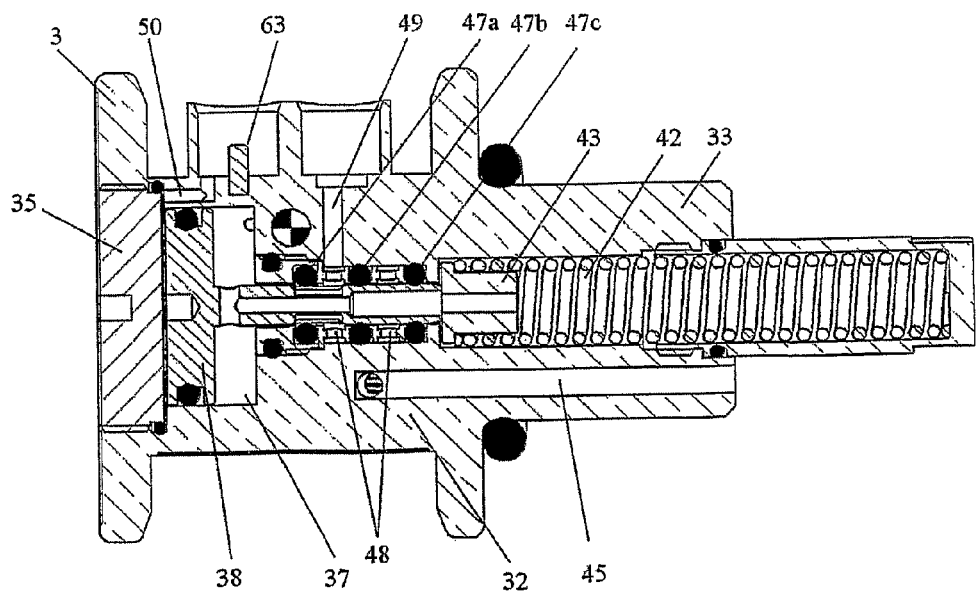
FIG. 17 is a further sectional view of the valve of FIG. 16.
Figure 18:
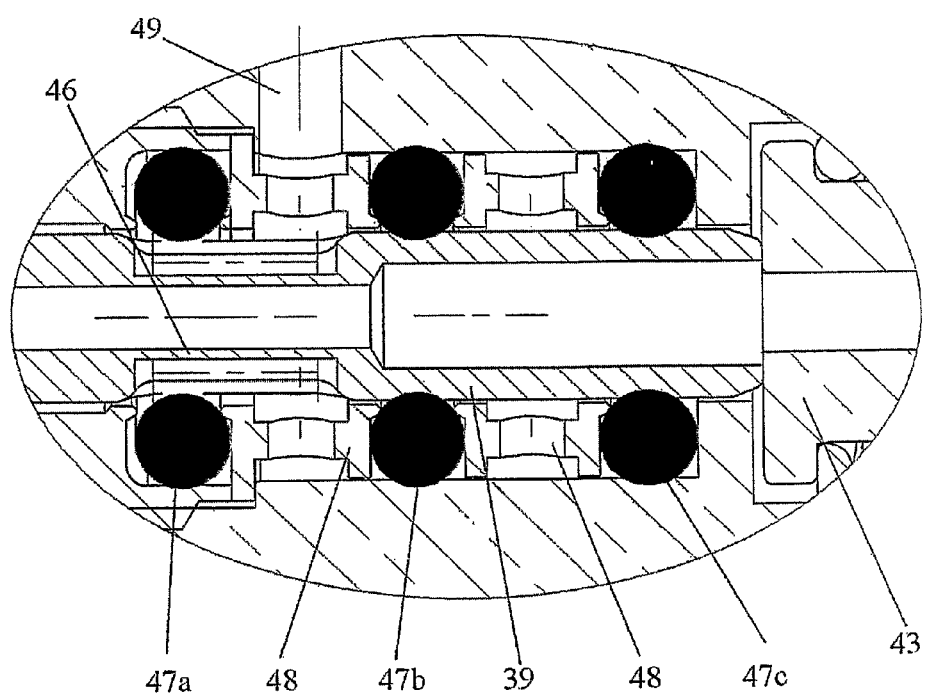
FIG. 18 is an expanded view of a portion of FIG. 17.

FIG. 17 shows a further section through the valve of FIG. 16, viewed from the opposite direction. The construction of the valve is in many respects similar to that of the valve of FIG. 6. As already mentioned, however, the cylinder gas passage 45 is in the embodiment of FIGS. 17 and 18 located on the opposite side of the valve from the outlet port. Pin 63 is arranged to actuate a poppet valve on the connector portion 9. As shown in more detail in the expanded view of FIG. 18, gas from the passage 45 can pass via an outlet (not shown) around the piston stem 39 by means of elongate slots 64 provided in the piston stem, into passage 49.

In the valves and assemblies of the invention having a balanced valve arrangement, the pilot gas pressure at which the valve is arranged to open is expediently a little lower than the minimum design pressure for the pilot gas so that, at the minimum design pressure of the pilot gas, opening of the valve will reliably ensue to overcome the effects of seal friction varying over time and spring manufacturing tolerances. The minimum design pressure might be the lowest input pressure to the system, for example, in the case of oxygen, the lowest pressure that would be expected from a cylinder regulator or wall outlet. However, if the system, for example, a gas mixer, uses a lower pressure internally, that may be the minimum design pressure. In the embodiment described, typical pressures of the pilot gas to obtain valve opening were in the range of 1.5 to 2.6 bar, for example, 2.2 to 2.6 bar. Other opening pressures may be appropriate in many circumstances.

Although the foregoing invention has been described in detail by way of illustration and example for purposes of understanding, it will be obvious that changes and modifications may be practised within the scope of the appended claims.

The invention claimed is:

1. An assembly of a gas cylinder fitted with a gas cylinder valve able to be opened by application of a pilot gas pressure, and a yoke;
   wherein the gas cylinder valve comprises a pilot gas chamber having an inlet connectable to a source of pressurised pilot gas, and a displaceable member able to act in concert with a valve member to open and close a gas passage placing an interior of the cylinder in communications with a cylinder gas port in the gas cylinder valve;
   wherein the displaceable member is normally biased into a valve closing position, but is able to be displaced by the pilot gas pressure against the bias from the valve closing position to a position in which the gas cylinder valve is open;
   wherein the yoke is able to connect the pilot gas chamber to the source of pressurised pilot gas and the cylinder gas port of the cylinder gas valve to an external cylinder gas passage;
   wherein the gas cylinder valve and the yoke are connected by interengageable structures provided on the valve and the yoke, the interengageable structures comprising external locating studs on the gas cylinder valve and cooperating regions in the yoke;
   wherein the yoke comprises a handle and a connector portion for connection to the cylinder valve, the handle being movable relative to the connector portion from a first position in which the gas cylinder is not locked to the yoke to a second position in which the gas cylinder is locked to the yoke, the connector portion comprising a pair of arms, both of which have cam surfaces which when the yoke is in position engage the external locating studs, the arms being so connected to the handle that operation of the handle causes the cam surfaces to move over the locating studs from a first position in which the yoke engages the gas cylinder valve but is not locked thereto to a second position in which the yoke is locked to the gas cylinder valve; and wherein the cam surfaces have, in use, a snail cam action.

2. An assembly of a gas cylinder fitted with a gas cylinder valve able to be opened by application of a pilot gas pressure and a yoke;

wherein the gas cylinder valve comprises a pilot gas chamber having an inlet connectable to a source of pressurised pilot gas, and a displaceable member able to act in concert with a valve member to open and close a gas passage placing an interior of the cylinder in communication with a cylinder gas port in the gas cylinder valve;

wherein the displaceable member is normally biased into a valve closing position, but is able to be displaced by the pilot gas pressure against the bias from the valve closing position to a position in which the gas cylinder valve is open;

wherein the yoke is able to connect the pilot gas chamber to the source of pressurised pilot gas and the cylinder gas port of the cylinder gas valve to an external cylinder gas passage;

wherein the gas cylinder valve and the yoke are connected by interchangeable structures provided on the gas cylinder valve and the yoke;

wherein the yoke has a pilot gas passage containing a pilot gas valve, the pilot gas valve having a valve member normally biased into a valve closing position, but able to be displaced from the valve closing position by the action of locking the yoke to the gas cylinder valve.

3. An assembly according to claim 2, wherein the valve member of the pilot gas valve is a poppet.

4. An assembly according to claim 2, wherein the cylinder gas port has a nozzle through which extends from a face thereof to the pilot gas chamber a pilot gas conduit, the nozzle being adapted to displace the valve member of the pilot gas valve so as to open the pilot gas passage thereby permitting flow of pilot gas from the pilot gas passage to the pilot gas chamber via the pilot gas conduit.

5. An assembly of a gas cylinder fitted with a gas cylinder valve able to be opened by application of a pilot gas pressure, and a yoke;

wherein the gas cylinder valve comprises a pilot gas chamber having an inlet connectable to a source of pressurised pilot gas, and a displaceable member able to act in concert with a valve member to open and close a gas passage placing an interior of the cylinder in communication with a cylinder gas port in the gas cylinder valve;

wherein the displaceable member is normally biased into a valve closing position, but is able to be displaced by the pilot gas pressure against the bias from the valve closing position to a position in which the gas cylinder valve is open;

wherein the yoke is able to connect the pilot gas chamber to the source of pressurised pilot gas and the cylinder gas port of the cylinder gas valve to an external cylinder gas passage;

wherein the gas cylinder valve and the yoke are connected by interengageable structures provided on the valve and the yoke, the interengageable structures comprising external locating studs on the gas cylinder valve and cooperating regions in the yoke;

wherein the yoke comprises a handle and a connector portion for connection to the cylinder valve, the handle being movable relative to the connector portion from a first position in which the gas cylinder is not locked to the yoke to a second position in which the gas cylinder is locked to the yoke, the connector portion comprising a pair of arms, both of which have cam surfaces which when the yoke is in position engage the external locating studs, the arms being so connected to the handle that operation of the handle causes the cam surfaces to move over the locating studs from a first position in which the yoke engages the gas cylinder valve but is not locked thereto to a second position in which the yoke is locked to the gas cylinder valve; and wherein the pilot gas passage downstream of the gas cylinder valve communicates with a locking chamber in the yoke, gas pressure in the locking chamber urging a retractable stop into a position in which the retractable stop is received in a complementary aperture in one of the said arms so as to lock the yoke in said second position to the gas cylinder valve.

6. An assembly according to claim 5, wherein one or both of the said arms has a detent which when the cam surfaces are in said second position engages a spring loaded ball carried in the yoke.

7. An assembly of a gas cylinder fitted with a gas cylinder valve able to be opened by application of a pilot gas pressure, and a yoke;

wherein the gas cylinder valve comprises a pilot gas chamber having an inlet connectable to a source of pressurised pilot gas, and a displaceable member able to act in concert with a valve member to open and close a gas passage placing an interior of the cylinder in communication with a cylinder gas port in the gas cylinder valve;

wherein the displaceable member is normally biased into a valve closing position, but is able to be displaced by the pilot gas pressure against the bias from the valve closing position to a position in which the gas cylinder valve is open;

wherein the yoke is able to connect the pilot gas chamber to a the source of pressurised pilot gas and the cylinder gas port of the cylinder gas valve to an external cylinder gas passage;

wherein the gas cylinder valve and the yoke are connected by interchangeable structures provided on the gas cylinder valve and the yoke;

wherein the yoke has a pilot gas passage containing a pilot gas valve; and wherein the gas cylinder valve has a pair of guide flanges to facilitate location of the yoke.

* * * * *